(12) United States Patent
Maurer

(10) Patent No.: US 8,176,654 B2
(45) Date of Patent: May 15, 2012

(54) METHOD AND DEVICE FOR PREVENTING CORROSION OF A GAS INLET NOZZLE DURING NITRIC ACID CONDENSATION

(75) Inventor: Rainer Maurer, Schwelm (DE)

(73) Assignee: ThyssenKrupp Uhde GmbH, Dortmund (DE)

( * ) Notice: Subject to any disclaimer, the term of this patent is extended or adjusted under 35 U.S.C. 154(b) by 410 days.

(21) Appl. No.: 12/449,531

(22) PCT Filed: Nov. 21, 2007

(86) PCT No.: PCT/EP2007/010062
§ 371 (c)(1),
(2), (4) Date: Aug. 12, 2009

(87) PCT Pub. No.: WO2008/098600
PCT Pub. Date: Aug. 21, 2008

(65) Prior Publication Data
US 2010/0040505 A1 Feb. 18, 2010

(30) Foreign Application Priority Data
Feb. 13, 2007 (DE) .......................... 10 2007 006 889

(51) Int. Cl.
| | |
|---|---|
| *A61L 9/00* | (2006.01) |
| *B01D 1/00* | (2006.01) |
| *C01B 21/00* | (2006.01) |
| *C01B 23/00* | (2006.01) |
| *B08B 5/00* | (2006.01) |
| *B08B 3/00* | (2006.01) |
| *F26B 5/04* | (2006.01) |
| *F26B 7/00* | (2006.01) |
| *F16K 49/00* | (2006.01) |

(52) U.S. Cl. .................... 34/428; 34/402; 422/4; 422/9; 422/10; 422/285; 422/307; 423/235; 423/237; 423/262; 423/269; 423/351; 423/DIG. 6; 423/DIG. 8; 423/392; 423/393; 423/394; 423/403; 134/11; 134/21; 134/105; 134/198; 137/338

(58) Field of Classification Search ............ 422/4, 9–10, 422/285, 307; 423/235, 237, 262, 269, 351, 423/DIG. 6, DIG. 8, 392–394, 403; 134/11, 134/21, 105, 198; 34/402, 428, 435, 548, 34/549; 137/338
See application file for complete search history.

(56) References Cited

U.S. PATENT DOCUMENTS
| | | | |
|---|---|---|---|
| 3,467,498 A | 9/1969 | Benner, Jr. et al. | |
| 3,586,055 A | 6/1971 | Wilson | |
| 5,266,291 A * | 11/1993 | Drnevich et al. | ............. 423/392 |

FOREIGN PATENT DOCUMENTS
| | | |
|---|---|---|
| DE | 1 195 280 | 10/1963 |
| WO | WO 91/16266 | 10/1991 |

* cited by examiner

OTHER PUBLICATIONS

International Search Report, Feb. 1, 2008 PCT EP/2007/010062.

*Primary Examiner* — Jill Warden
*Assistant Examiner* — Monzer Chorbaji
(74) *Attorney, Agent, or Firm* — Collard & Roe, P.C.

(57) ABSTRACT

By a method and a device for preventing corrosion on and in the region of a gas inlet nozzle during nitric acid condensation, contact of the condensing gas with the nozzle and with the surroundings of the nozzle are supposed to be minimized. This is achieved in that the gas inlet nozzle has a sleeve on the inside in the transition region to the interior of the condenser, by which sleeve a gas inlet orifice in the form of an annular gap is formed, whereby the annular space is provided with at least one feed opening for secondary air, so that an enveloping flow of secondary air is produced around the entering NO gas.

2 Claims, 1 Drawing Sheet

Figure 1:
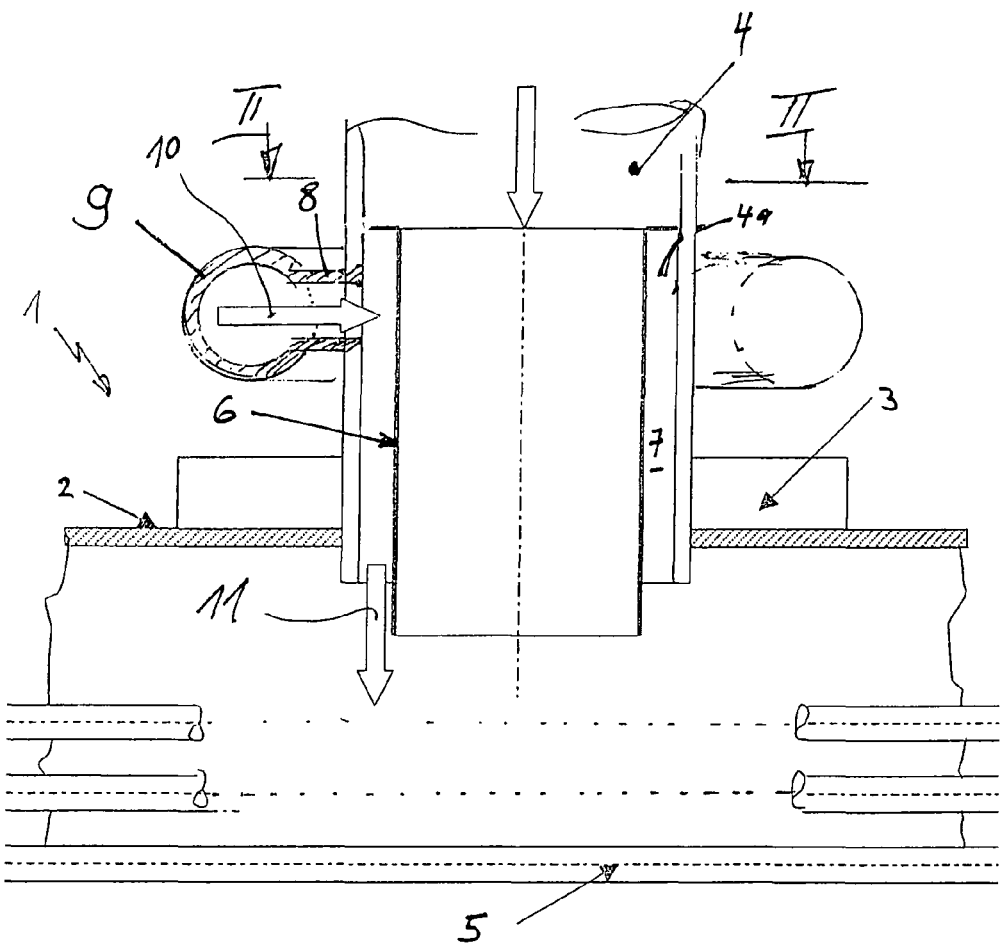

METHOD AND DEVICE FOR PREVENTING CORROSION OF A GAS INLET NOZZLE DURING NITRIC ACID CONDENSATION

CROSS REFERENCE TO RELATED APPLICATIONS

This application is the National Stage of PCT/EP2007/010062 filed on Nov. 21, 2007, which claims priority under 35 U.S.C. §119 of German Application No. 10 2007 006 889.3 filed on Feb. 13, 2007. The international application under PCT article 21(2) was not published in English.

This invention relates to a method and a device for preventing corrosion on and in the region of a gas inlet nozzle during nitric acid condensation.

In nitric acid facilities that operate under high pressure >10 bar, the condensation point of the acid is correspondingly high, at about 120° C. This leads to higher corrosive attacks on the gas nozzles on the inlet side, especially in the first gas-cooling stage. Increased acid condensation occurs especially at the transition zones between the cooled jacket and the hot nozzle wall, followed by revaporization. The acid, then concentrated except for the azeotrope, leads to severe rates of erosion of the stainless steel material to the point of leakage.

This is the starting point for the invention, the task of which consists in minimizing the contact of the condensing gas with the nozzle and its surroundings.

This problem is solved according to the invention by a method of the type indicated initially, in that the gas inlet nozzle has a sleeve on the inside in the transition region to the interior of the condenser, by which sleeve a gas inlet orifice in the form of an annular gap is formed, whereby the annular space is provided with at least one feed opening for secondary air, so that an enveloping flow of secondary air is produced around the entering NO gas.

Providing a veil of secondary air on the inside wall of the gas inlet nozzle prevents, or minimizes to a substantial degree, the contact of the NO gas with this inside wall, and thereby it is correspondingly protected.

According to the invention, such an enveloping flow can be produced by blowing in the secondary air through a plurality of inlet holes on the gas inlet nozzle.

An important benefit of the method of procedure according to the invention consists in the fact that only a portion of the secondary air supplied to the condenser by way of a bypass is needed for this protective measure, so that no process changes at all are necessary because of the method of procedure of the invention.

Since the entering gas has about a 17% fraction of water, which is brought about primarily by the water of combustion, and the condensation point of the water and of the acid then immediately formed depends on the partial pressure of the water, the condensation starts at higher temperatures, in particular at higher gas pressures. The partial pressure of the water vapor is then correspondingly reduced by the proposed measure, by the veil and thus by the addition of air, and the condensing gas is kept completely away from the wall of the pipe, so that no condensation, and thus no acid formation, can any longer occur on the inside of the nozzle conducting the pressure.

According to the invention, the above problem can also be solved by a device that is characterized in that the gas inlet nozzle has a sleeve on the inside in the transition region to the interior of the condenser, by which a gas inlet orifice in the form of an annular gap is formed, whereby the annular space is equipped with at least one feed orifice for secondary air.

As already explained above, the secondary air displaces the aggressive condensing gas completely from the gap between the inside wall of the nozzle and the additional pipe, with the result that no acid can be formed here. This protects the inner nozzle (liner) formed by the pipe from attack by acid, since the wall temperature can always be kept above the condensation temperature by the hot secondary air.

A feed nozzle for different gas streams to a mixing chamber with a central pipe through which a first stream flows, which pipe is surrounded by at least one jacket pipe forming an annular space with the feed of a second gas stream, is itself known; reference is made here to U.S. Pat. No. 3,467,498 or in comparable construction to U.S. Pat. No. 3,586,055, both of which are concerned with preparing pigmented metal oxide. Preventing contact of an aggressive gas stream with components to be protected against corrosion by means of an enveloping flow is not addressed here.

Embodiments of the invention are evident from the further dependent claims.

In this connection, it can be provided that a plurality of secondary air inlet orifices are provided upstream in the direction of flow of the entering NO gas, on the gas inlet nozzle, whereby it is practical if these secondary air inlet orifices are linked by way of a ring line and connected with the source of secondary air, as is likewise provided in a further embodiment of the invention.

It is advantageous for the secondary air to be connected to the secondary air source of a high-pressure nitric acid facility.

Figure 2:
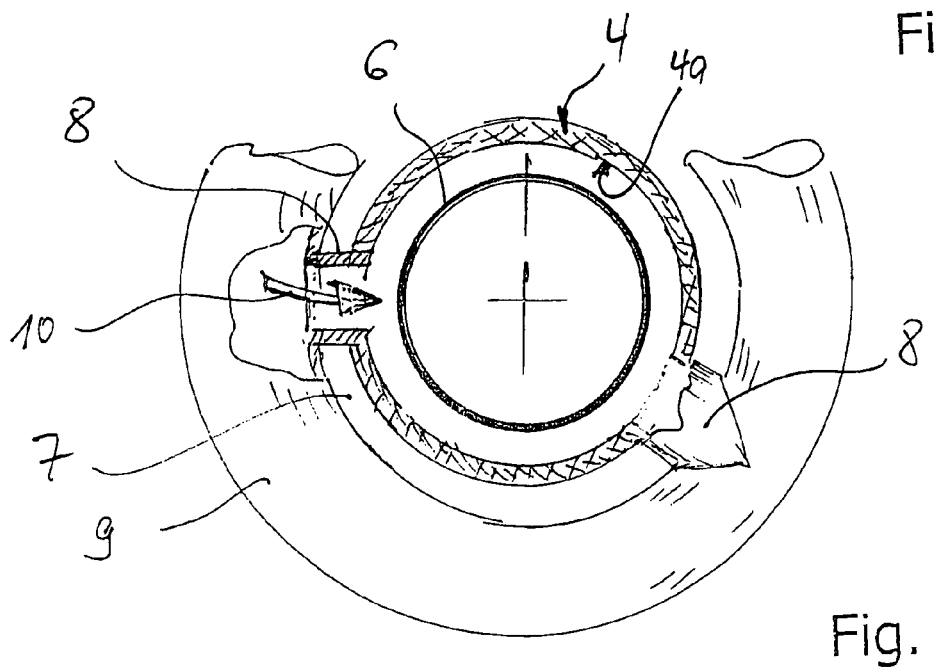

Other characteristics, details, and advantages of the invention are evident from the following description and with reference to the drawing. The drawing shows:

FIG. 1 a sectional drawing from the region of a gas inlet nozzle in a nitric acid condenser, and FIG. 2 a top view, in partial section, of the gas inlet nozzle, along Line II-II in FIG. 1.

The condenser labeled in general as 1 has a condenser jacket 2 with a cooled jacket region 3, through which a gas inlet nozzle for the NO gas labeled as 4 passes. The cooling tubes of the acid condenser are labeled in general as 5 in FIG. 1, and are partially cut away for reasons of the illustration.

As shown in FIG. 1, the gas inlet nozzle 4 has a safety nozzle 6 in the transition region to the inside of the condenser 1, which nozzle forms an annular space labeled 7, in the manner of a gap, toward the inside wall 4a of the gas inlet nozzle 4. The annular space 7 is connected with secondary air inlet nozzles 8 distributed around its circumference on a ring line 9, which in turn is connected, for example, to the secondary air source of a high-pressure nitric acid facility, which is not shown in detail in the figures. An enveloping flow 11 is formed by the secondary air inlet, indicated by the arrow 10 in FIG. 1, between the inside wall 4a of the gas inlet nozzle 4 and the safety nozzle or sleeve 6.

Since the secondary air generally has such a high temperature that there is no condensation of the $NO_x$ gas on the safety nozzle or sleeve 6, the safety nozzle 6 is not in danger of corrosion.

Naturally, the exemplary embodiment of the invention as described can also be modified in multiple respects, without departing from the basic concept. Thus, the invention is not limited in particular to proportions and distribution of the secondary air inlet nozzles and their distribution around the circumference. This also applies to the size and diameter of the corresponding components and to the gap width of the gap 7 through which the secondary air flows.

The invention claimed is:

1. A method for preventing corrosion on and near a gas inlet nozzle during nitric acid condensation, the method comprising:

provinding the gas inlet nozzle with a sleeve on an inside portion of the gas inlet nozzle, in a transition region to an interior portion of a condenser, to form a gas inlet orifice comprising an annular gap having an annular space and providing the annular space with at least one feed opening for secondary air, so that an enveloping flow of secondary air is produced around NO gas entering the gas inlet nozzle.

2. A method according to claim 1, wherein the enveloping flow of secondary air is produced by blowing in the secondary air through a plurality of inlet holes on the gas inlet nozzle to form a secondary air veil.

* * * * *